US012272287B2

(12) United States Patent
Zhang et al.

(10) Patent No.: US 12,272,287 B2
(45) Date of Patent: Apr. 8, 2025

(54) METHOD FOR ADJUSTING GAMMA VOLTAGE OF DISPLAY MODULE

(71) Applicants: Chengdu BOE Optoelectronics Technology Co., Ltd., Chengdu (CN); BOE TECHNOLOGY GROUP CO., LTD., Beijing (CN)

(72) Inventors: Jiaxiang Zhang, Beijing (CN); Gong Chen, Beijing (CN); Yuan Fang, Beijing (CN); Lian Xiang, Beijing (CN); Yakun Kong, Beijing (CN); Xiaoliang Fu, Beijing (CN); Seungyong Oh, Beijing (CN); Bin Zhang, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/271,944

(22) PCT Filed: Sep. 30, 2022

(86) PCT No.: PCT/CN2022/123005
§ 371 (c)(1),
(2) Date: Jul. 12, 2023

(87) PCT Pub. No.: WO2024/065574
PCT Pub. Date: Apr. 4, 2024

(65) Prior Publication Data

US 2024/0386826 A1 Nov. 21, 2024

(51) Int. Cl.
*G09G 3/20* (2006.01)
*G09G 3/3225* (2016.01)

(52) U.S. Cl.
CPC ......... *G09G 3/2007* (2013.01); *G09G 3/3225* (2013.01); *G09G 2320/0247* (2013.01);
(Continued)

(58) Field of Classification Search
CPC .... G09G 3/2007; G09G 3/3406; G09G 5/006; G09G 2320/0242; G09G 2320/0276;
(Continued)

(56) References Cited

U.S. PATENT DOCUMENTS

2014/0267448 A1* 9/2014 Albrecht .............. G09G 3/3406 345/84
2018/0233089 A1* 8/2018 Okamoto .......... H01L 21/02266
2022/0406266 A1* 12/2022 Liao ..................... G09G 3/3607

FOREIGN PATENT DOCUMENTS

CN 109686307 A 4/2019
CN 112419959 A 2/2021
(Continued)

OTHER PUBLICATIONS

International Search Report in PCT/CN2022/123005 in Chinese dated Jun. 5, 2023.
(Continued)

*Primary Examiner* — Shaheda A Abdin
(74) *Attorney, Agent, or Firm* — Collard & Roe, P.C.; William Collard

(57) ABSTRACT

A method for adjusting a gamma voltage of a display module is provided. The method includes: obtaining a gamma voltage of the display module at a basic refresh frequency; obtaining an associated relationship between the gamma voltage of the display module at the basic refresh frequency and a gamma voltage of the display module at a target refresh frequency; and determining the gamma voltage of the display module at the target refresh frequency based on
(Continued)

the gamma voltage of the display module at the basic refresh frequency and the associated relationship.

14 Claims, 10 Drawing Sheets

(52) U.S. Cl.
CPC .............. *G09G 2320/0673* (2013.01); *G09G 2340/0435* (2013.01)

(58) Field of Classification Search
CPC ... G09G 2320/0285; G09G 2320/0626; G09G 2320/103; G09G 2330/021; G09G 2330/022; G09G 2340/0435; G09G 2360/18
See application file for complete search history.

(56) References Cited

FOREIGN PATENT DOCUMENTS

| | | | |
|---|---|---|---|
| CN | 112542123 | A | 3/2021 |
| CN | 115116374 | A | 9/2022 |
| WO | 2022/120986 | A1 | 6/2022 |

OTHER PUBLICATIONS

Written Opinion of the International Searching Authority of PCT/CN2022/123005 in Chinese dated Jun. 5, 2023.

* cited by examiner

METHOD FOR ADJUSTING GAMMA VOLTAGE OF DISPLAY MODULE

CROSS REFERENCE TO RELATED APPLICATIONS

This application is the National Stage of PCT/CN2022/123005 filed on Sep. 30, 2022, the disclosure of which is incorporated by reference.

TECHNICAL FIELD

The present disclosure relates to a technology field of display and specifically, to a method for adjusting a gamma voltage of a display module and a corresponding display module.

BACKGROUND

Low Temperature Polycrystalline Oxide (LTPO) technology is one of core technologies for display module design in the smart era. An adaptive refresh frequency, i.e., switching different refresh frequencies adaptively according to usage scenarios without any change in picture quality, is one of important functions realized by LTPO display module.

An existing LTPO display module performs gamma tuning (Gamma Tuning) only in refresh frames (high frequency), and in hold frames (low frequency), gamma voltages of the refresh frames are borrowed, and differences in picture quality at different frequencies are reduced by adjusting related voltage in the hold frames. However, according to the current integrated circuit chip (IC) design, voltage settings of different gray levels under a same display brightness value (DBV) in the display module are the same, which causes differences in brightness between high and low gray levels of the display module during a frequency switching process, i.e. causing a strobe.

When the display module with strobe defects are applied in electronic devices including display screens commonly used in daily life, it will affect user's experience. In addition, the strobe in the display screen of electronic devices may also have an impact on the user's health. For example, if the human eye receives low-frequency strobe stimulation for a long time, it will produce eye muscle fatigue, causing eye and even physical discomfort.

SUMMARY

The present disclosure proposes a gamma voltage adjusting method for improving a multi-frequency switching (e.g., variable refresh rate, VRR) effect of a LTPO display module, in which different gamma voltages can be used according to different frequencies. The method can effectively improve the VRR effect of different gray levels at the same DBV during frequency switching without taking up a large storage space of the IC and increasing the time for gamma tuning.

At least one embodiment of the present disclosure provides a method for adjusting a gamma voltage of a display module, and the method comprises: obtaining a gamma voltage of the display module at a basic refresh frequency: obtaining an associated relationship between the gamma voltage of the display module at the basic refresh frequency and a gamma voltage of the display module at a target refresh frequency: and determining the gamma voltage of the display module at the target refresh frequency based on the gamma voltage of the display module at the basic refresh frequency and the associated relationship.

For example, in the adjusting method provided by an embodiment of the present disclosure, the associated relationship corresponds to a display brightness value of the display module, and different display brightness values correspond to respective associated relationships.

For example, the adjusting method provided by an embodiment of the present disclosure further comprises: determining a current display brightness value of the display module: obtaining the gamma voltage of the display module at the basic refresh frequency comprises: obtaining, at the current display brightness value, the gamma voltage of the display module at the basic refresh frequency: and obtaining the associated relationship between the gamma voltage of the display module at the basic refresh frequency and the gamma voltage of the display module at the target refresh frequency comprises: obtaining, at the current display brightness value, the associated relationship between the gamma voltage of the display module at the basic refresh frequency and the gamma voltage of the display module at the target refresh frequency.

For example, in the adjusting method provided by an embodiment of the present disclosure, the associated relationship comprises a proportional relationship, and obtaining, at the current display brightness value, the associated relationship between the gamma voltage of the display module at the basic refresh frequency and the gamma voltage of the display module at the target refresh frequency comprises: for each gray level of a plurality of gray levels, obtaining, at the current display brightness value, a proportional relationship between a gamma voltage of the gray level at the basic refresh frequency and a gamma voltage of the gray level at the target refresh frequency.

For example, in the adjusting method provided by an embodiment of the present disclosure, the proportional relationship is characterized by $Y=\alpha y$, and wherein Y denotes a gamma voltage of one gray level at the target refresh frequency, y denotes a gamma voltage of the one gray level at the basic refresh frequency, and $\alpha$ denotes a gamma ratio.

For example, in the adjusting method provided by an embodiment of the present disclosure, the proportional relationship is a gamma ratio, and obtaining the proportional relationship between the gamma voltage of the gray level at the basic refresh frequency and the gamma voltage of the gray level at the target refresh frequency of the display module at the current display brightness value comprises: obtaining gamma ratios of at least two specific gray levels of the plurality of gray levels, wherein the gamma ratio indicates a ratio between a gamma voltage of one gray level at the basic refresh frequency and a gamma voltage of the one gray level at the target refresh frequency of the display module at the current display brightness value: and performing interpolation based on the gamma ratios of the at least two specific gray levels to obtain the gamma ratio for each gray level of the plurality of gray levels.

For example, in the adjusting method provided by an embodiment of the present disclosure, the proportional relationship is a gamma ratio, and obtaining, at the current display brightness value, the proportional relationship between the gamma voltage of the gray level at the basic refresh frequency and the gamma voltage of the gray level at the target refresh frequency comprises: for each gray level of the plurality of gray levels, determining, among the basic refresh frequency and a plurality of non-basic refresh frequencies, at least two non-basic refresh frequencies close to the target refresh frequency: for each non-basic refresh frequency of the at least two non-basic refresh frequencies, obtaining a gamma ratio for the non-basic refresh frequency, wherein the gamma ratio for the non-basic refresh frequency indicates a ratio between a gamma voltage of one gray level at the basic refresh frequency and a gamma voltage of the one gray level at the non-basic refresh frequency of the display module at the current display brightness value: and performing interpolation based on gamma ratios for respective non-basic refresh frequencies among the at least two non-basic refresh frequencies to obtain a gamma ratio for the target refresh frequency.

For example, in the adjusting method provided by an embodiment of the present disclosure, determining the gamma voltage of the display module at the target refresh frequency based on the gamma voltage of the display module at the basic refresh frequency and the associated relationship comprises: for each gray level of the plurality of gray levels, determining, at the current display brightness value of the display module, the gamma voltage of the gray level at the target refresh frequency based on a product of the gamma voltage of the gray level at the basic refresh frequency and the proportional relationship between the gamma voltage of the gray level at the basic refresh frequency and the gamma voltage of the gray level at the target refresh frequency.

For example, in the adjusting method provided by an embodiment of the present disclosure, the associated relationship comprises a polynomial relationship, and obtaining, at the current display brightness value, the associated relationship between the gamma voltage of the display module at the basic refresh frequency and the gamma voltage of the display module at the target refresh frequency comprises: obtaining a plurality of coefficients of a polynomial characterizing a voltage relationship curve between gamma voltages of respective gray levels at the basic refresh frequency and gamma voltages of the respective corresponding gray levels at the target refresh frequency of the display module at the current display brightness value.

For example, in the adjusting method provided by an embodiment of the present disclosure, the polynomial relationship is characterized by $\Delta y=ax^2+bx+c$, and wherein $\Delta y$ denotes a difference between a gamma voltage of one gray level at the basic refresh frequency and a gamma voltage of the one gray level at the target refresh frequency, x denotes the gray level, and a, b, and c are polynomial coefficients.

For example, in the adjusting method provided by an embodiment of the present disclosure, determining the gamma voltage of the display module at the target refresh frequency based on the gamma voltage of the display module at the basic refresh frequency and the associated relationship comprises: determining, at the current display brightness value of the display module, the gamma voltages of the respective gray levels at the target refresh frequency based on the gamma voltages of the respective gray levels at the basic refresh frequency and the plurality of coefficients.

At least one embodiment of the present disclosure further provides a method for determining an associated relationship between gamma voltages of a display module, and the method comprises: measuring a gamma voltage of the display module at a basic refresh frequency: measuring a gamma voltage of the display module at one or more non-basic refresh frequencies: and determining the associated relationship between the gamma voltages of the display module based on the gamma voltage of the display module at the basic refresh frequency and the gamma voltage of the display module at the one or more non-basic refresh frequencies.

For example, in the determining method provided by an embodiment of the present disclosure, the associated relationship corresponds to a display brightness value of the display module, and different display brightness values correspond to respective associated relationships.

For example, the determining method provided by an embodiment of the present disclosure further comprises: measuring a current display brightness value of the display module: measuring the gamma voltage of the display module at the basic refresh frequency comprises: measuring, at the current display brightness value, gamma voltages of a plurality of gray levels of the display module at the basic refresh frequency: and measuring the gamma voltage of the display module at the one or more non-basic refresh frequencies comprises: for each non-basic refresh frequency of the one or more non-basic refresh frequencies, measuring, at the current display brightness value, gamma voltages of the plurality of gray levels of the display module at the non-basic refresh frequency.

For example, in the determining method provided by an embodiment of the present disclosure, the associated relationship comprises a proportional relationship, and determining the associated relationship between the gamma voltages of the display module based on the gamma voltage of the display module at the basic refresh frequency and the gamma voltage of the display module at the one or more non-basic refresh frequencies comprises: for each non-basic refresh frequency of the one or more non-basic refresh frequencies, determining, at the current display brightness value, gamma ratios indicating ratios between the gamma voltages of the plurality of gray levels at the basic refresh frequency and the gamma voltages of respective corresponding gray levels at the non-basic refresh frequency.

For example, in the determining method provided by an embodiment of the present disclosure, the associated relationship comprises a proportional relationship, and determining the associated relationship between the gamma voltages of the display module based on the gamma voltage of the display module at the basic refresh frequency and the gamma voltage of the display module at the one or more non-basic refresh frequencies comprises: for each gray level of the plurality of gray levels, determining, at the current display brightness value, a gamma ratio indicating a ratio between the gamma voltage of the gray level at the basic refresh frequency and the gamma voltage of the gray level at the one or more non-basic refresh frequencies.

For example, in the determining method provided by an embodiment of the present disclosure, the associated relationship comprises a polynomial relationship, and determining the associated relationship between the gamma voltage of each of the plurality of gray levels at the basic refresh frequency and the gamma voltage of each of the plurality of gray levels at the one or more non-basic refresh frequencies at the current display brightness value comprises: determining, at the current display brightness value, a plurality of coefficients of a polynomial for characterizing a voltage relationship curve between the gamma voltages of the plurality of gray levels at the basic refresh frequency and the gamma voltages of the plurality of corresponding gray levels at the one or more non-basic refresh frequencies of the display module.

At least one embodiment of the present disclosure further provides a display apparatus, the display apparatus comprises a memory and a processor coupled to the memory, and the processor is configured to: obtain a gamma voltage of the display apparatus at a basic refresh frequency: obtain an associated relationship between the gamma voltage of the display apparatus at the basic refresh frequency and a gamma voltage of the display apparatus at a target refresh frequency: and determine the gamma voltage of the display apparatus at the target refresh frequency based on the gamma voltage of the display apparatus at the basic refresh frequency and the associated relationship.

BRIEF DESCRIPTION OF THE DRAWINGS

In order to illustrate the technical solutions of embodiments of the present disclosure clearly, a brief description of the accompanying drawings of the embodiments will be given below, and it will be apparent that the accompanying drawings in the following description are only related to some embodiments of the present disclosure and are not a limitation of the present disclosure, wherein.

DETAILED DESCRIPTION

In order to make the purpose, technical solutions and advantages of the embodiments of the present disclosure clearer, the technical solutions of the embodiments of the present disclosure will be described below clearly and completely in conjunction with the accompanying drawings of the embodiments of the present disclosure. Obviously, the described embodiments are only some of the embodiments of the present disclosure, but not all embodiments. Based on the described embodiments of the present disclosure, all other embodiments obtained by a person of ordinary skill in the art without creative labor would fall into the scope of protection of the present disclosure.

Unless otherwise defined, technical terms or scientific terms used in this disclosure shall have the ordinary meaning as understood by a person of ordinary skill in the art to which this disclosure belongs. The terms "first," "second," and the like as used in this disclosure do not indicate any order, number, or importance, but are used only to distinguish the different components. Similarly, the words "a", "one", or "this" and similar words do not indicate a numerical limitation, but rather the presence of at least one. Similar words such as "comprises" or "contains" are intended to mean that the components or objects appearing before the word cover the components or objects listed after the word and their equivalents, and do not exclude other components or objects. Similar words such as "connected" or "connected" are not limited to physical or mechanical connections, but may comprise electrical connections, whether directly or indirectly. The terms "up", "down", "left", "right", etc. are used only to indicate relative position relationships, and when the absolute position of the object being described is changed, the term When the absolute position of the described object changes, the relative position relationship may also change accordingly.

Figure 1A:
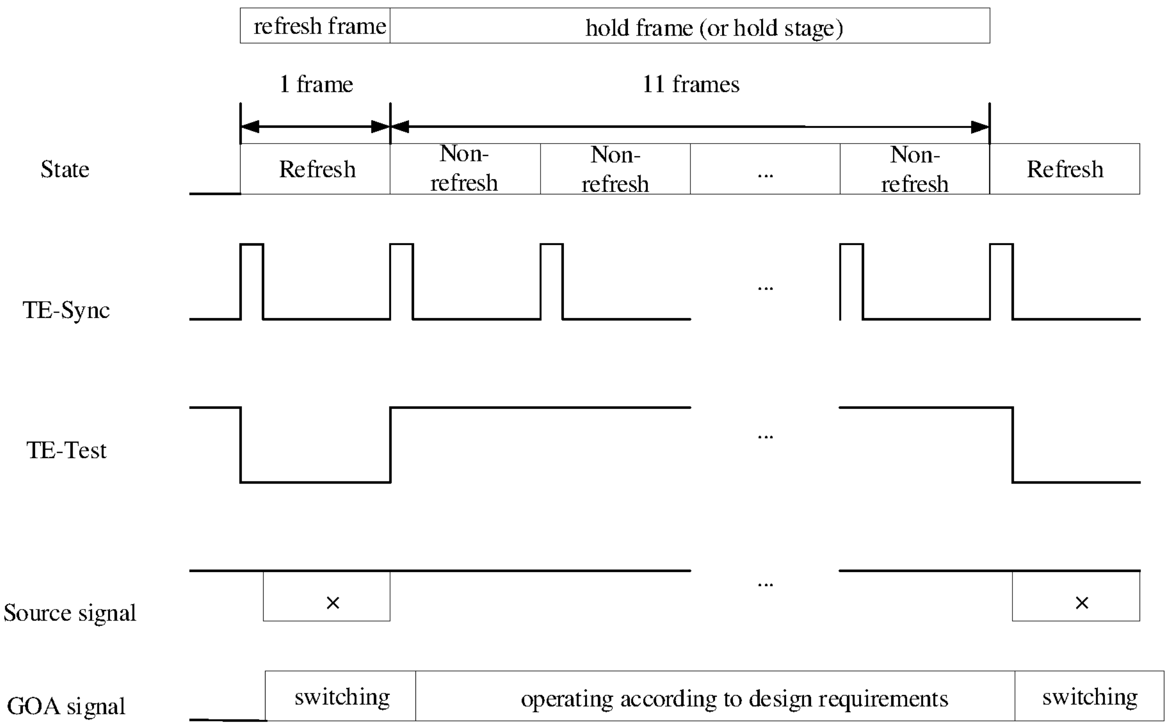
FIG. 1A is a schematic diagram of a timing of a LTPO display module driven by a low refresh frequency.

FIG. 1A is a schematic diagram of a timing of a LTPO display module driven by a low refresh frequency. As shown in FIG. 1A, the LTPO display module may be driven by a combination of refresh frames and hold frames. The refresh frame refers to a frame in which pixel data is updated, and the hold frame refers to a frame in which the pixel data is not updated (i.e., only held). In FIG. 1A, making a 10 Hz of low refresh frequency mode as an example, a reference frequency (i.e., a basic refresh frequency) is 120 Hz, and a cycle may comprise 1refresh frame and 11 hold frames. In FIG. 1A, TE-sync is a frame synchronization signal, TE-test indicates the refresh frame, and GOA signal indicates action switching.

Figure 1B:
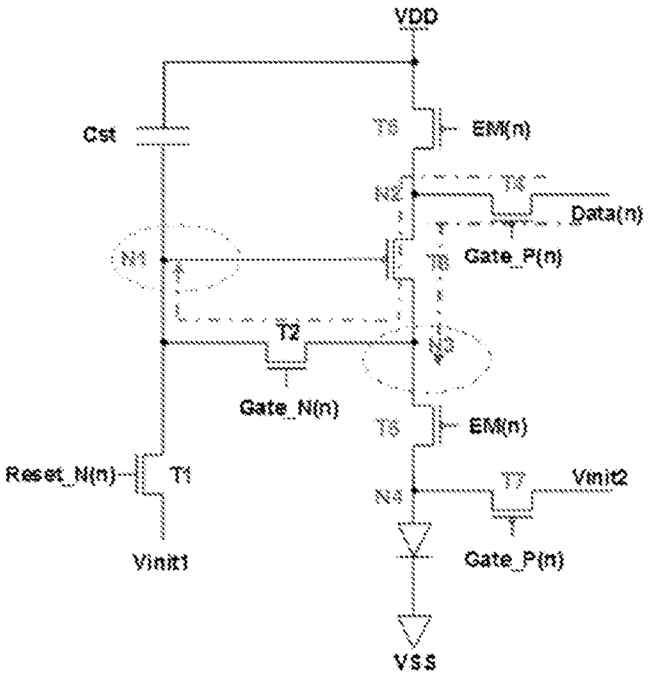
FIG. 1B is a schematic diagram illustrating difference in brightness of the LTPO display module at different gray levels at high refresh frequency and low refresh frequency.

FIG. 1B is a schematic diagram illustrating difference in brightness of the LTPO display module at different gray levels at high refresh frequency and low refresh frequency. Usually, the high refresh frequency refers to a refresh frequency higher than 80 Hz and the low refresh frequency refers to a refresh frequency lower than 60 Hz.

As shown in FIG. 1B, in the refresh frame, a data voltage Data (n) is updated, a source voltage of a transistor T2 (shown as node N3 in the drawings) is refreshed, and Gate-N (n) turns on the transistor T2 to write a data voltage to a capacitor $C_{st}$: in the hold frame, the data voltage Data (n) is not updated, and Gate-N (n) turns off the transistor T2 and no data voltage is written to CST. However, because Gate-N (n) is turned off and the source voltage Data (n) is not refreshed in the hold frame, a difference in the voltages exists at node N3 between the refresh frame and the hold frame. Specifically, the voltage at node N3 is higher in the hold frame, causing a transistor T6 be turned on in advance to precharge a node N4, and thus a voltage at node N4 becomes higher in the hold frame, resulting in a difference in brightness between the hold frame and the refresh frame in the LTPO display module. Therefore, if the source voltage does not change during a refresh frequency switching process, the difference in the voltages at node N3 and node N4 between the refresh frame and the hold frame will cause a screen flicker at the low refresh frequency and a screen flicker during the switching process between the high refresh frequency and low refresh frequency. In FIG. 1B, EM (n) is a light-emitting control signal and is provided to gates of transistors T5 and T6, Reset_N (n) is a reset signal, Gate-P (n) is a gate control signal of the transistors T4 and T7, the node N1 is connected to the gate of transistor T3, and Vinit1 and Vinit2 are initial setting signals.

Figure 1C:
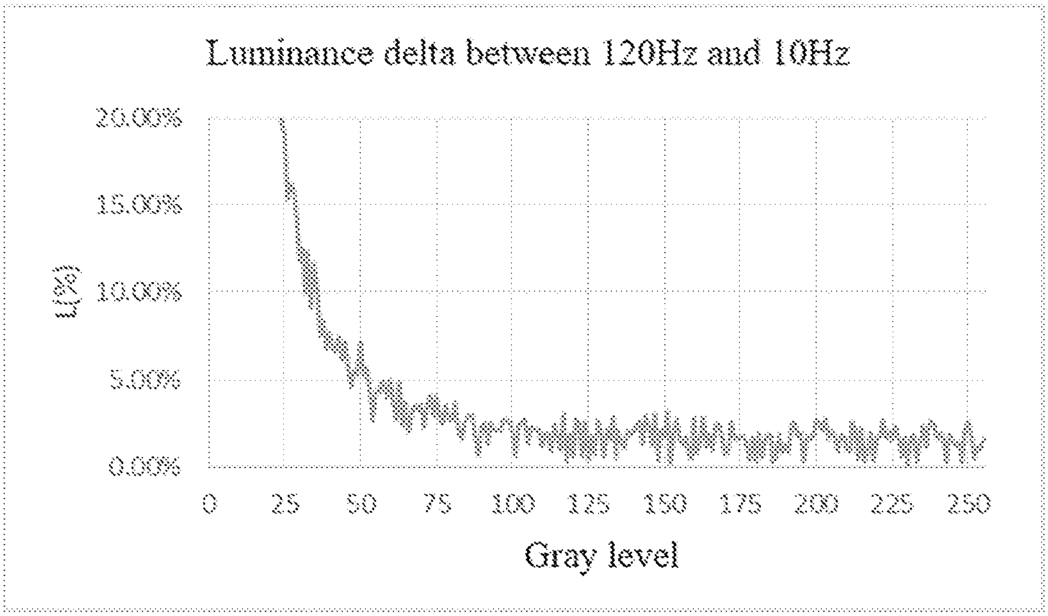
FIG. 1C is a diagram illustrating the measured difference in brightness of LTPO module at different gray levels at high refresh frequency and low refresh frequency.

FIG. 1C is a diagram illustrating the measured difference in brightness of LTPO module at different gray levels at high refresh frequency and low refresh frequency. As shown in FIG. 1C, brightness differences exist between different gray levels at 120 Hz and 10 Hz at the same DBV, wherein horizontal axis denotes the gray level and vertical axis denotes the brightness difference, specifically, the brightness difference between the gray level at 120 Hz and 10 Hz gradually decreases as the gray level gradually increases.

Because of inevitable influences from TFT production process, a pixel circuit of LTPO display module may generate a certain disturbance current ΔI. The brightness at the high gray level is high and a current I1 is great, while the brightness at the low gray level is low and a current I2 is small, i.e. I1>I2. Influences of the disturbance current ΔI on the high and low gray level are ΔI/I1<ΔI/I2 respectively, i.e. the influence of disturbance current on the high gray level is smaller and on the low gray level is larger. Therefore, when the refresh frequency is switched at the same DBV, there is a large difference in brightness and color between the high and low gray levels.

According to the existing LTPO driving method, the driving voltages of different gray levels at the same DBV are same except that the source voltages are different. However, this driving method cannot meet a demand of small brightness and chromaticity differences for both the high and low gray levels when the refresh frequency switching is performed at the same DBV. Reducing the voltage difference at the node N4 between the high and low refresh frequencies is an effective way to improve the brightness difference between the different gray levels when the refresh frequency switching is performed at the same DBV.

Applying different gamma voltages to the different gray levels at different refresh frequencies may change the voltages of the high and low gray levels at node N4, which may change the difference between the voltages at the N4 point at the high and low refresh frequencies, thus improving the difference in brightness between the high and low gray levels during refresh frequency switching at the same DBV.

Figure 2:
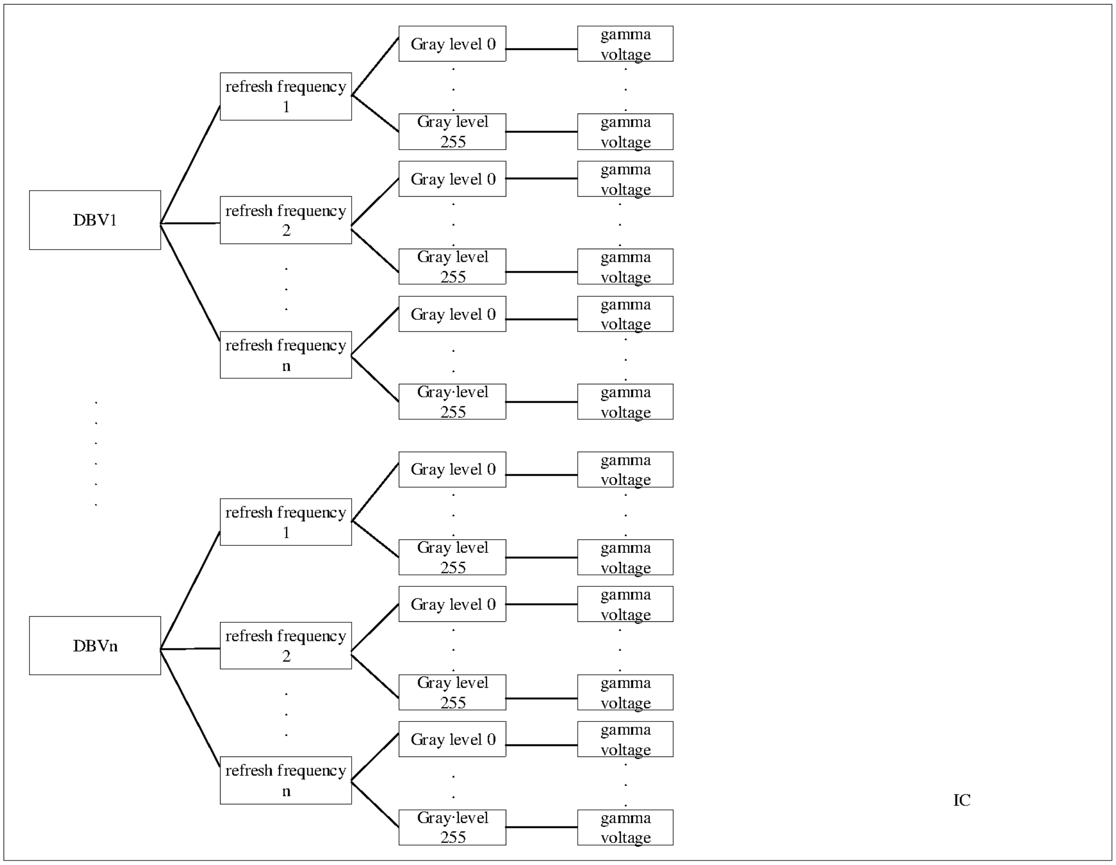
FIG. 2 is a schematic diagram of a method for storing gamma voltages of respective gray levels at different DBVs at different refresh frequencies.

In some embodiments, the gamma voltages of different gray levels at different refresh frequencies at different DBVs may be stored and read as needed according to actual usages. FIG. 2 is a schematic diagram of a method for storing gamma voltages of respective gray levels at different DBVs at different refresh frequencies. Specifically, gamma tuning is performed at different refresh frequencies for the different DBVs to determine the gamma voltages of different gray levels at different refresh frequencies at different DBVs, and the determined gamma voltages are stored in a chip IC. When the LTPO display module switches to other refresh frequencies from the current refresh frequency at a certain DBV, the stored gamma voltages of respective gray levels at the other refresh frequencies are read from the IC and applied to improve the VRR effect during the process of switching from the current refresh frequency to the other refresh frequencies.

The gamma voltages of a plurality of gray levels at a plurality of different refresh frequencies corresponding to a plurality of DBVs may be stored in the IC. In an example, the current refresh frequency of the LTPO display module is 120 Hz, and when the display module is to be switched to a refresh frequency of 30 Hz, the gamma voltages of different gray levels of the LTPO display module at the refresh frequency of 30 Hz corresponding to the current DBV may be read from the IC and the plurality of read gamma voltages may be applied.

By calling the gamma voltages of different gray levels for respective different refresh frequencies at the different refresh frequencies, the brightness difference of different gray levels at the same DBV during the refresh frequency switching process can be effectively improved, thus effectively enhancing a picture quality level of the LTPO display module and improving the VSR effect of the LTPO display module.

However, since the LTPO display module needs to switch among multiple refresh frequencies, it may require a lot of gamma tuning time in case of the gamma tuning is performed for each refresh frequency, and it requires additional storage space in the IC to store relevant data, such as the gamma voltages of different gray levels at different refresh frequencies obtained by gamma tuning, which may significantly increase manufacturing cost of the LTPO display module. Therefore, there is a need to find an effective and reasonable method to solve the problem of gamma tuning at a plurality of refresh frequencies and related data storage.

To this end, the present disclosure proposes a tuning method for optimizing the VRR effect of LTPO display module, which can apply different gamma voltages to different gray levels at different refresh frequencies without taking up a large storage space of the IC and requiring excessive gamma tuning time. This method can effectively improve the VRR effect for the different gray levels as switching the refresh frequencies at the same DBV, and balance a voltage variation at node N4 of the pixel circuit between the high and low gray levels, so that the difference in brightness between the high and low gray levels between the refresh frame and hold frame can be effectively reduced.

Figure 3:
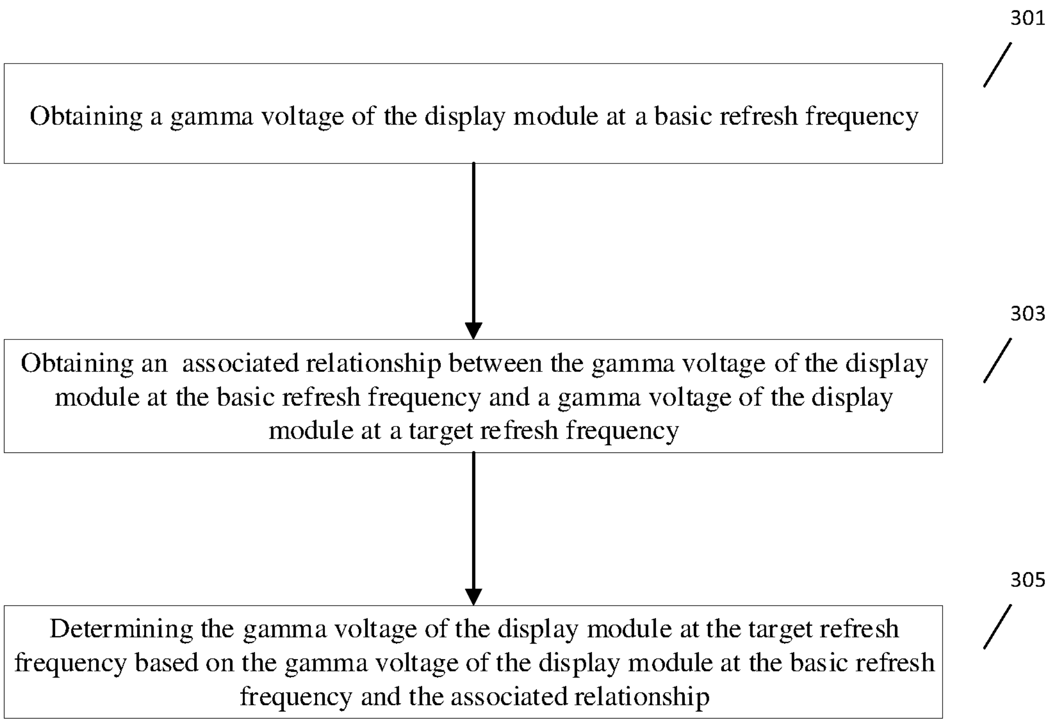
FIG. 3 is a flowchart of a method for adjusting a gamma voltage of the LTPO display module to improve the VSR effect according to embodiments of the present disclosure.

FIG. 3 is a flowchart of a method for adjusting a gamma voltage of a LTPO display module to improve the VRR effect according to embodiments of the present disclosure.

As shown in FIG. 3, at 301, the gamma voltages of respective gray levels of the LTPO display module at a basic refresh frequency are obtained. The LTPO display module may have a plurality of different DBVs, and the plurality of gray levels at different refresh frequencies at the different DBVs have different gamma voltages. Specifically, the gamma voltages of respective gray levels of the LTPO display module at the basic refresh frequency at the different DBVs are stored in the IC, and when it is necessary to obtain the gamma voltages of respective gray levels of the LTPO display module at the basic refresh frequency, the current DBV of the LTPO display module is determined first, and then the gamma voltages of respective gray levels at the basic refresh frequency corresponding to the current DBV are obtained from the IC.

At 303, associated relationships between the gamma voltages of respective gray levels of the LTPO display module at the basic refresh frequency and the gamma voltages of respective gray levels of the LTPO display module at a target refresh frequency are obtained.

In some embodiments, the associated relationship may be a proportional relationship. In an example, the proportional relationship may denote a proportional relationship between the gamma voltage of one gray level at the basic refresh frequency and the gamma voltage of the one gray level at a non-basic refresh frequency at the same DBV. For example, the proportional relationship may be characterized by $Y=\alpha y$, wherein y denotes the gamma voltages of different gray levels at the basic refresh frequency, Y denotes the gamma voltages of the corresponding gray levels at the non-basic refresh frequency, and $\alpha$ denotes ratios between the gamma voltages of the different gray levels at the basic refresh frequency and the gamma voltages of the corresponding gray levels at the target refresh frequency, i.e., the gamma ratio.

In other embodiments, the associated relationship may be a polynomial relationship. In an example, the polynomial relationship may denote difference between the gamma voltage of one gray level at the basic refresh frequency and the gamma voltage of the one gray level at a non-basic refresh frequency at the same DBV. The polynomial relationship may be characterized by $\Delta y=ax^2+bx+c$, wherein $\Delta y$ denotes the difference between the gamma voltage at the target refresh frequency and the gamma voltage at the basic refresh frequency, x denotes a gray level, and a, b, and c are polynomial coefficients.

Then, at 305, the gamma voltages of the respective gray levels at the target refresh frequency are determined based on the gamma voltages of the corresponding gray levels at the basic refresh frequency and the associated relationships.

If the associated relationship is the proportional relationship, the gamma voltages of respective gray levels at the target refresh frequency may be a product of the gamma voltages of the corresponding gray levels at the basic refresh frequency and the gamma ratios.

If the associated relationship is the polynomial relationship, the difference $\Delta y$ between the gamma voltages of respective gray levels at the basic refresh frequency and the gamma voltages of the corresponding gray levels at the non-basic refresh frequency at the same DBV may be obtained by $\Delta y=ax^2+bx+c$ at first, and then the gamma voltages of the respective gray levels at the non-basic refresh frequency may be obtained by $Y=y+\Delta y$.

Hereinafter, some embodiments of the present disclosure will be described in detail with reference to the accompanying FIGS. 4-5. It should be noted that the same or similar accompanying marks in the different accompanying drawings will be used to refer to the same components that have been described.

Figure 4A:
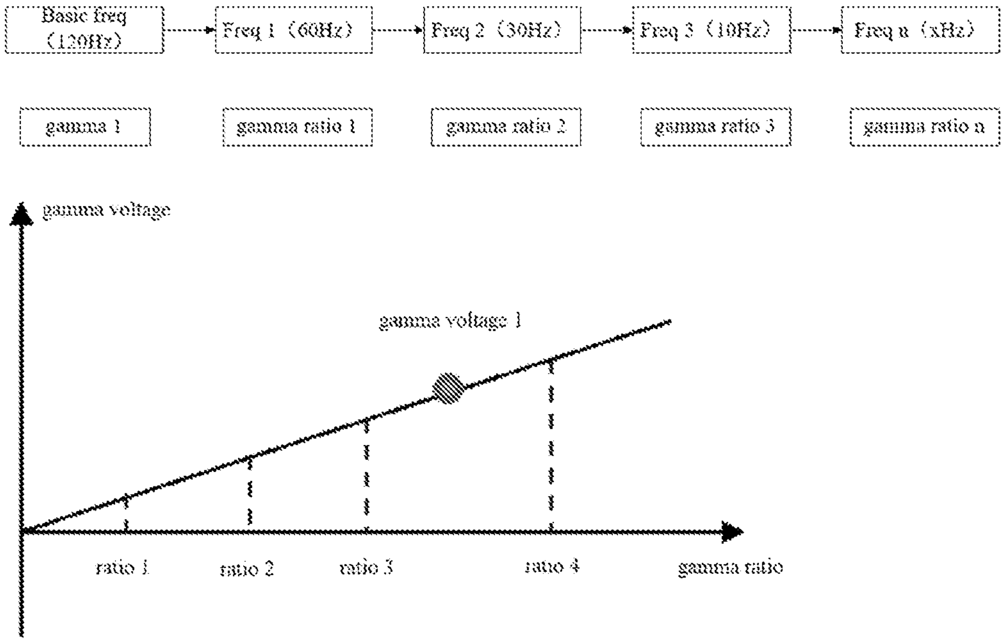
FIG. 4A illustrates a schematic diagram of a proportional relationship between gamma voltages of a gray level at non-basic refresh frequencies and the gamma voltage of the corresponding gray level at a basic refresh frequency at the same DBV according to embodiments of the present disclosure.

FIG. 4A illustrates a schematic diagram of a proportional relationship between the gamma voltages of a gray level at non-basic refresh frequencies and the gamma voltage of the corresponding gray level at a basic refresh frequency at the same DBV according to embodiments of the present disclosure. The proportional relationship may be characterized by the following equation:

$$Y=\alpha y,$$

wherein y denotes the gamma voltages of the different gray levels at the basic refresh frequency, Y denotes the gamma voltages of the corresponding gray levels at the non-basic refresh frequencies, and $\alpha$ denotes the ratios between the gamma voltages of the different gray levels at the basic refresh frequency and the gamma voltages of the corresponding gray levels at the target refresh frequencies, i.e., the gamma ratios.

For the same gray level at the same DBV, it has different gamma ratios at the different non-basic refresh frequencies. As shown in FIG. 4A, under the same DBV, the gamma voltage of a certain gray level at the basic refresh frequency of 120 Hz is gamma 1, and the gamma ratio between the gamma voltage of the gray level at the non-basic refresh frequency 1 of 60 Hz and the gamma voltage of the gray level at the basic refresh frequency of 120 Hz is gamma ratio 1: the gamma ratio between the gamma voltage of the gray level at the non-basic refresh frequency 2 of 30 Hz and the gamma voltage of the gray level at the basic refresh frequency of 120 Hz is gamma ratio 2: the gamma ratio between the gamma voltage of the gray level at the non-basic refresh frequency 3 of 10 Hz and the gamma voltage of the gray level at the basic refresh frequency of 120 Hz is gamma ratio 3: and so on, the gamma ratio between the gamma voltage of the gray level at the non-basic refresh frequency n of x Hz and the gamma voltage of the gray level at the basic refresh frequency of 120 Hz is the gamma ratio n.

Figure 4B:
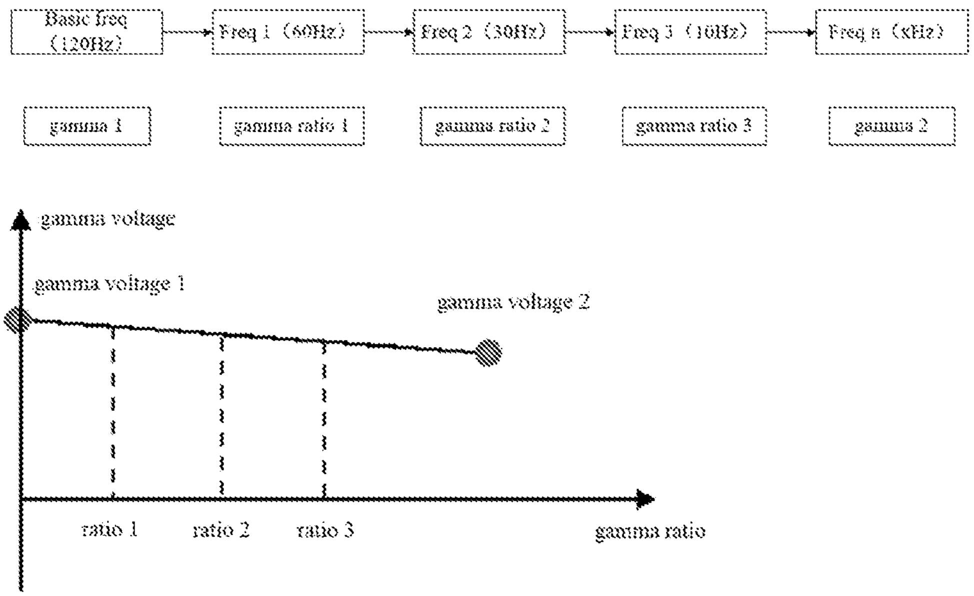
FIG. 4B illustrates a schematic diagram of a method for determining gamma voltages of respective gray levels at non-basic refresh frequencies using the proportional relationship of FIG. 4A, according to embodiments of the present disclosure.

FIG. 4B illustrates a schematic diagram of a method for determining the gamma voltages of respective gray levels at a non-basic refresh frequency with the proportional relationship of FIG. 4A, according to embodiments of the present disclosure.

In FIG. 4B, the horizontal axis indicates the gamma ratio and the vertical axis indicates the gamma voltage. As shown in FIG. 4B, regarding the same DBV, the same gray level has different gamma ratios at the different non-basic refresh frequencies.

In some embodiments, when the LTPO display module is to be switched to the non-basic refresh frequency, i.e., the target refresh frequency, the current DBV of the LTPO display module is determined first, and then the gamma voltages of gray levels at the basic refresh frequency at the current DBV and the gamma ratios of the multiple tap points of gray levels at the target refresh frequency stored in the IC are obtained, the gamma ratios corresponding to non-tap points of gray levels are obtained by performing linear interpolation, and the gamma voltages of the plurality of gray levels at the target refresh frequency are obtained by the product of the gamma voltages of the plurality of gray levels at the basic refresh frequency and the gamma ratios of the corresponding gray levels obtained by performing interpolation.

In an example, the LTPO display module has a current refresh frequency of 120 Hz and a target refresh frequency of 30 Hz. First, the current DBV of the LTPO display module is determined, and the gamma ratios of the tap points of gray levels at the refresh frequency of 30 Hz corresponding to the current DBV is obtained from the IC. For example, the tap points of gray levels may be 0, 16, 32, 64, 128 and 255, i.e., the gamma ratios of these gray levels may be obtained. And, the gamma ratios of the non-tap points of gray level being not stored in the IC may be obtained by the performing linear interpolation. For example, if the gamma ratio of the tap point of gray level 0 is gamma ratio 1 and the gamma ratio of the tap point of gray level 16 is gamma ratio 2, then the gamma ratios of the other gray levels between the gray level 0 and gray level 16 may be obtained by performing linear interpolation. Specifically, a gamma ratio of the gray level 4 may be calculated by the following equation:

$$\text{gamma ratio} = \frac{\text{gamma ratio2} - \text{gamma ratio1}}{16 - 4} \times 4$$

wherein gamma ratio denotes the gamma ratio, gamma ratio1 denotes the gamma ratio 1, and gamma ratio2 denotes the gamma ratio 2. Similarly, the gamma ratios of other non-tap points of gray levels may be obtained by performing linear interpolation in this way.

After the gamma ratios of respective gray levels at the target refresh frequency are obtained, the gamma voltage of each gray level at the target refresh frequency may be calculated by the equation Y=αy. For example, the gamma voltage of gray level 0 at the basic refresh frequency is gamma1, and the gamma ratio of gray level 0 at the target refresh frequency is the gamma ratio 1, then the gamma voltage of gray level 0 at the target refresh frequency is gamma ratio 1×gamma1.

Figure 4C:
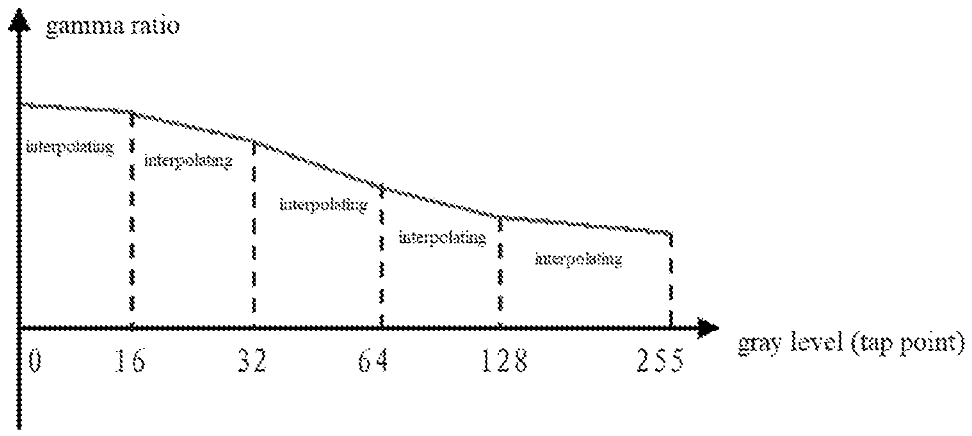
FIG. 4C illustrates a schematic diagram of another method for determining gamma voltages of respective gray levels at non-basic refresh frequencies using the proportional relationship of FIG. 4A, according to embodiments of the present disclosure.

FIG. 4C illustrates a schematic diagram of another method for determining the gamma voltages of respective gray levels at a non-basic refresh frequency with the proportional relationship of FIG. 4A, according to embodiments of the present disclosure.

In FIG. 4C, the horizontal axis indicates the gray level and the vertical axis indicates the gamma ratio. As shown in FIG. 4C, regarding the same DBV, different gray levels have different gamma ratios at the same non-basic refresh frequency.

In some embodiments, when the LTPO display module is to be switched to a non-basic refresh frequency, i.e., a target refresh frequency, if the gamma ratios corresponding to the target refresh frequency has been stored in the IC (i.e., that target refresh frequency is one of several tap points of non-basic refresh frequencies), the stored gamma ratios may be directly called to determine the gamma voltages of the gray levels at that target refresh frequency. Specifically, the current DBV of the LTPO display module is determined firstly, and then the gamma voltages of the gray levels at the basic refresh frequency at the current DBV and the gamma ratios corresponding to the target refresh frequency stored in the IC may be obtained directly, thus the gamma voltages of the gray levels at the target refresh frequency are determined by multiplying the gamma voltages of the gray levels at the basic refresh frequency and the gamma ratios.

In an example, the gamma ratios of gray levels at refresh frequencies of 10 Hz, 30 Hz, 60 Hz and 90 Hz at different DBVs are stored in the IC, the current refresh frequency of the LTPO display module is 120 Hz, and the target refresh frequency is 30 Hz. Since the gamma ratios of gray levels at the refresh frequency of 30 Hz at different DBVs have been already stored in the IC, gamma ratios may be obtained directly and the corresponding gamma voltages may be calculated. First, the current DBV of the LTPO display module is determined, and the gamma ratios of the gray levels at the target refresh frequency of 30 Hz corresponding to the current DBV and the gamma voltages of the gray levels at the basic refresh frequency, which are stored in the IC, are obtained. Then, the gamma voltages of the gray levels at the target refresh frequency may be calculated by the equation Y=αy.

In other embodiments, when the LTPO display module is to be switched to a non-basic refresh frequency, i.e., the target refresh frequency, if the gamma ratios corresponding to that target refresh frequency are not stored in the IC (i.e., the target refresh frequency is not a tap point of non-basic refresh frequencies), the gamma ratios corresponding to the target refresh frequency may be obtained by performing linear interpolation operation, so as to determine the gamma voltages of the gray levels at the target refresh frequency. Specifically, the current DBV of the LTPO display module is determined firstly, and subsequently the gamma voltages of the gray levels at the basic refresh frequency at the current DBV and the gamma ratios corresponding to the several tap points of non-basic refresh frequencies, which are stored in IC, may be obtained, and the gamma ratios corresponding to the target refresh frequency may be obtained by performing linear interpolation, and the gamma voltages of gray levels at the target refresh frequency are determined by multiplying the gamma voltages of the gray levels at the basic refresh frequency and the gamma ratios obtained by performing interpolation.

In an example, the gamma ratios of gray levels at the refresh frequencies of 10 Hz, 30 Hz, 60 Hz and 90 Hz at different DBVs are stored in the IC, the current refresh frequency of the LTPO display module is 120 Hz, and the target refresh frequency is 50 Hz. The gamma ratios of gray levels at a refresh frequency of 50 Hz at the different DBVs are not stored in the IC, so it is necessary to obtain the gamma voltages of the gray levels at the refresh frequency of 50 Hz by performing linear interpolation. For example, if the gamma ratio of a gray level at the refresh frequency of 30 Hz is gamma ratio 3 and the gamma ratio of the gray level at the refresh frequency of 60 Hz is gamma ratio 4, then the gamma voltage of the corresponding gray level at the refresh frequency of 50 Hz may be calculated by the following equation:

$$\text{gamma ratio} = \frac{\text{gamma ratio4} - \text{gamma ratio3}}{60 - 30} \times 50$$

wherein gamma ratio denotes the gamma ratio, gamma ratio3 denotes the gamma ratio 3, and gamma ratio4 denotes the gamma ratio 4. After the gamma ratio of the gray level at the target refresh frequency is obtained, the gamma voltage of the gray level at the target refresh frequency may be calculated by the equation Y=αy.

Figure 5:
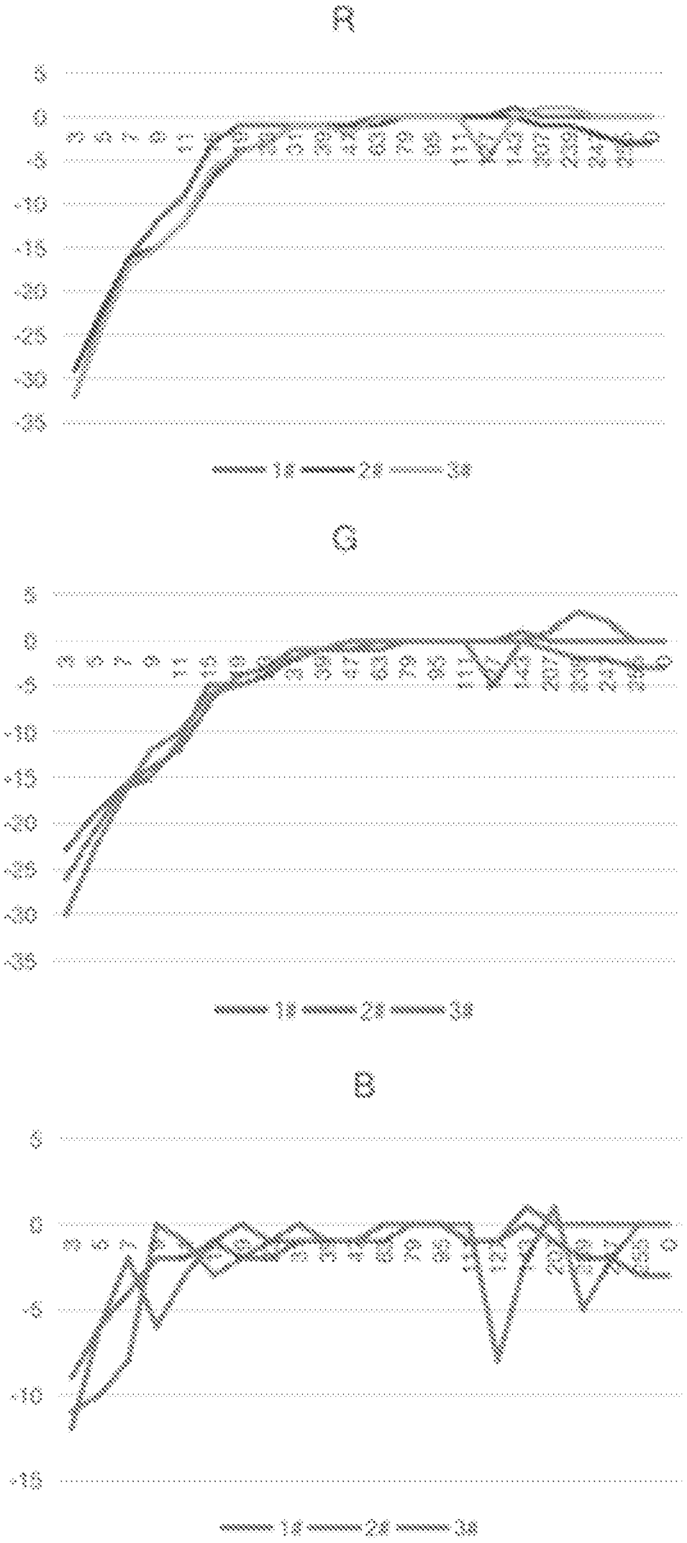
FIG. 5 is a schematic diagram of a relationship of differences between the gamma voltages of different gray levels at non-basic refresh frequencies and the gamma voltages of different gray levels at the basic refresh frequency, according to embodiments of the present disclosure.

FIG. 5 is a schematic diagram illustrating the relationship between the differences between the gamma voltages of different gray levels at a non-basic refresh frequency and the gamma voltages of the different gray levels at a basic refresh frequency according to embodiments of the present disclosure.

The relationship shown in FIG. 5 may be characterized by the following polynomial:

$$\Delta y = ax^2 + bx + c$$

wherein Δy denotes the difference between the gamma voltages of different gray levels at the basic refresh frequency and the gamma voltages of the different gray levels at the non-basic refresh frequency, x denotes the gray level, and a, b, and c are the coefficients of the polynomial, respectively.

In some embodiments, when the LTPO display module is to be switched to a non-basic refresh frequency, i.e., the target refresh frequency, the difference Δy between the gamma voltages of a plurality of gray levels at the target refresh frequency and the gamma voltages of the corresponding gray levels at the basic refresh frequency may be calculated by calling the polynomial $\Delta y=ax^2+bx+c$ and the coefficients a, b, and c of the polynomial corresponding to the target refresh frequency. Then, the gamma voltages of the corresponding gray levels at the basic refresh frequency is obtained from the IC and the gamma voltages of the plurality of gray levels at the target refresh frequency are determined by the formula Y=y+Δy.

In an example, the coefficients a, b, and c of the polynomial at the refresh frequencies of 10 Hz, 30 Hz, 60 Hz, and 90 Hz are stored in the IC. The current refresh frequency of the LTPO display module is 120 Hz and the target refresh frequency is 30 Hz. Because the coefficients a, b, and c of the polynomial at the target refresh frequency of 30 Hz has been stored in the IC already, the coefficients may be obtained directly and the differences between the gamma voltages of respective gray levels at the target refresh frequency and the gamma voltages of the corresponding gray levels at the basic refresh frequency may be calculated by $\Delta y=ax^2+bx+c$. Then, the gamma voltage of each gray level at the target refresh frequency may be determined by Y=y+Δy.

In another example, the coefficients a, b, and c of the polynomial at the refresh frequencies of 10 Hz, 30 Hz, 60 Hz, and 90 Hz are stored in the IC. The current refresh frequency of the LTPO display module is 120 Hz and the target refresh frequency is 50 Hz. Since the coefficients a, b, and c of the polynomial at the target refresh frequency of 50 Hz are not stored in the IC, it is necessary to obtain the coefficients a, b, and c of the polynomial at the refresh frequency of 50 Hz by performing linear interpolation. Specifically, coefficients a1, b1, c1 of the polynomial at the refresh frequency of 30 Hz and coefficients a2, b2, c2 of the polynomial at the refresh frequency of 60 Hz are obtained firstly. By performing linear interpolation, coefficients a3 of the polynomial at the target refresh frequency of 50 Hz may be calculated by the following Equation:

$$a3 = \frac{a2 - a1}{60 - 30} \times 50.$$

Similarly, coefficients b3 and c3 of the polynomial at the target refresh frequency of 50 Hz may be calculated as $$b3 = \frac{b2 - b1}{60 - 30} \times 50 \text{ and } c3 = \frac{c2 - c1}{60 - 30} \times 50,$$

respectively.

Hereinafter, the determination of the associated relationship in the above embodiments according to the present disclosure will be described in accordance to FIGS. 6-7.

Figure 6:
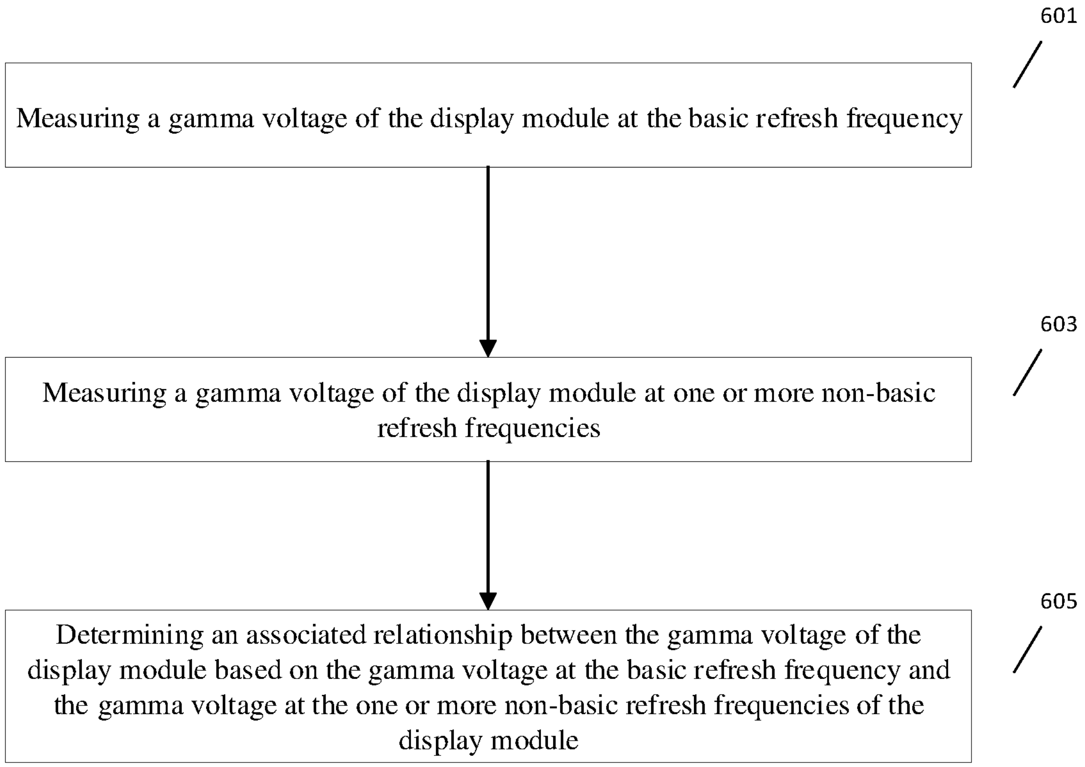
FIG. 6 is a flowchart of a method for determining relationships between gamma voltages of respective gray levels at the basic refresh frequency and gamma voltages of respective gray levels at non-basic refresh frequencies, according to embodiments of the present disclosure.

FIG. 6 is a flow chart of a method for determining the associated relationship between the gamma voltages of respective gray levels at the basic refresh frequency and the gamma voltages of corresponding gray levels at non-basic refresh frequencies according to embodiments of the present disclosure.

As shown in FIG. 6, at 601, the gamma voltages of respective gray levels of the LTPO display module at the basic refresh frequency are measured. The LTPO display module may have a plurality of different DBVs, and the plurality of gray levels have different gamma voltages at different refresh frequencies at the different DBVs. Specifically, for the different DBVs, a gamma tuning is performed at the basic refresh frequency to obtain gamma voltages for the respective gray levels at the different DBVs at the basic refresh frequency.

At 603, the gamma voltages of the LTPO display module for the respective gray levels at one or more non-basic refresh frequencies are measured. Specifically, for each non-basic refresh frequency of the one or more non-basic refresh frequencies, the gamma tuning is performed at the non-basic refresh frequency at the different DBVs, to obtain the gamma voltages of the respective gray levels at the non-basic refresh frequency at the different DBVs.

At 605, the associated relationship between the gamma voltages of the display module is determined based on the gamma voltages of the respective gray levels at the basic refresh frequency and the gamma voltages of the corresponding gray levels at the one or more non-basic refresh frequencies of the LTPO display module.

In some embodiments, for each non-basic refresh frequency of the one or more non-basic refresh frequencies, it may be determined that a proportional relationship exists between the gamma voltages of the respective gray levels at the basic refresh frequency and the gamma voltages of the corresponding gray levels at the non-basic refresh frequency at the same DBV. Alternatively, for each gray level of the respective gray levels, it may be determined that a proportional relationship exists between the gamma voltage of the gray level at the basic refresh frequency and the gamma voltage of the gray level at one or more non-basic refresh frequencies at the same DBV. The proportional relationship may be characterized by Y=αy, and determining the proportional relationship comprises determining a ratio a, which may also be referred to as a gamma ratio.

In other embodiments, for each non-basic refresh frequency of one or more non-basic refresh frequencies, it may be determined that, for different DBVs, the differences between the gamma voltages of the respective gray levels at the basic refresh frequency and the gamma voltages of the corresponding gray levels at the non-basic refresh frequency complies to a polynomial relationship. The polynomial relationship may be characterized by $\Delta y=ax^2+bx+c$, and determining the polynomial relationship comprises determining the coefficients a, b, and c of the polynomial.

Figure 7A:
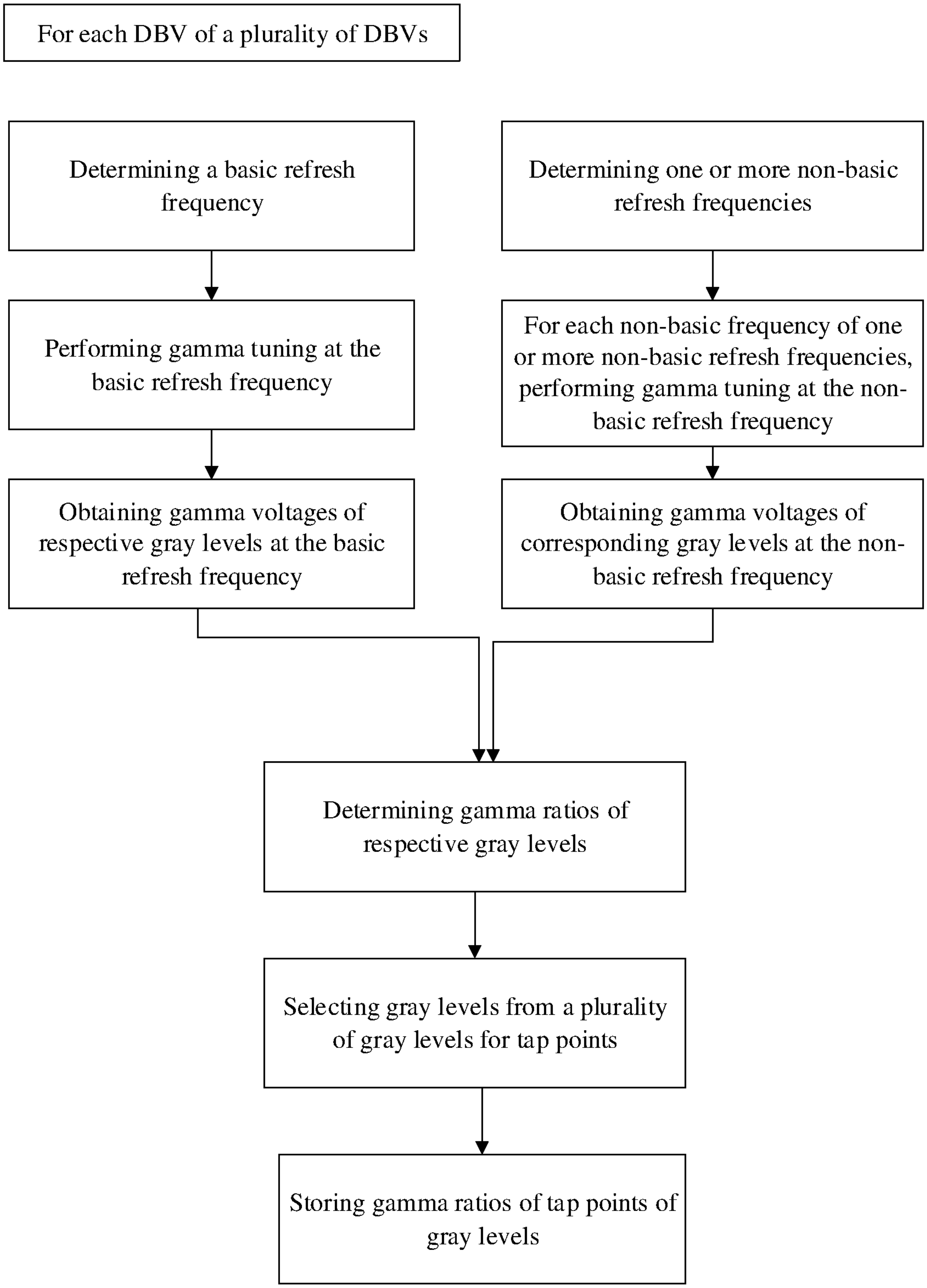
FIGS. 7A and 7B are schematic diagrams of a method for determining proportional relationships between the gamma voltages of respective gray levels at the basic refresh frequency and the gamma voltages of respective gray levels at non-basic refresh frequencies, according to embodiments of the present disclosure.
Figure 7B:
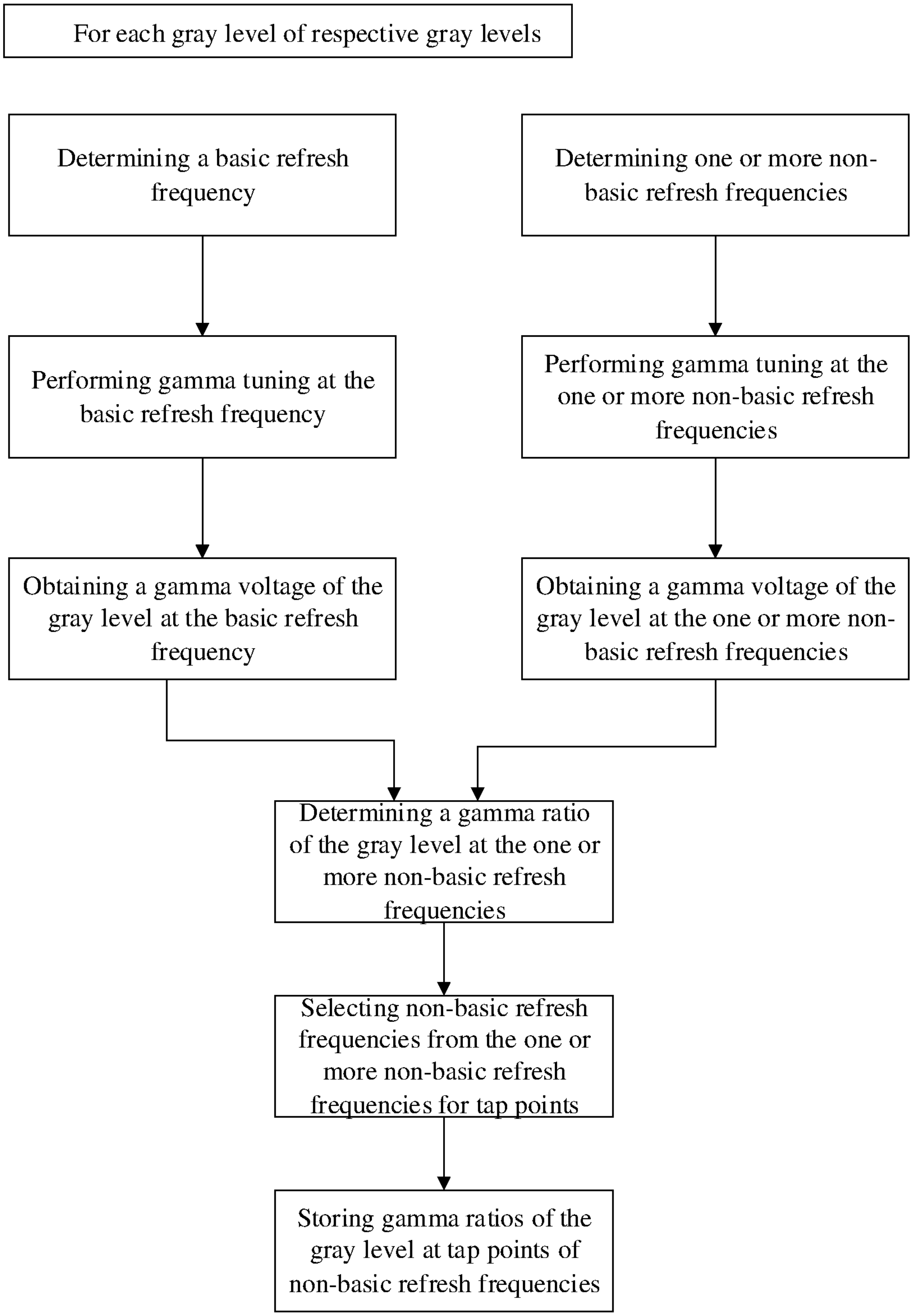

FIG. 7A and FIG. 7B are schematic diagrams of a method for determining a proportional relationship between the gamma voltages at respective gray levels at the basic refresh frequency and the gamma voltages at corresponding gray levels at one or more non-basic refresh frequencies, in accordance with embodiments of the present disclosure.

FIG. 7A illustrates a schematic diagram for determining, for each non-basic refresh frequency of one or more non-basic refresh frequencies, the proportional relationship between the gamma voltages of the respective gray levels at the basic refresh frequency and the gamma voltages of the corresponding gray levels at the non-basic refresh frequency at the same DBV.

Referring to FIG. 7A, for each DBV of a plurality of DBVs, the gamma tuning is performed at the basic refresh frequency to determine the gamma voltages of the plurality of gray levels at the basic refresh frequency at the DBV. For each non-basic refresh frequency of the one or more non-basic refresh frequencies, the gamma tuning is performed at the non-basic refresh frequency to determine the gamma voltages of the corresponding gray levels at the non-basic refresh frequency at the DBV. For each non-basic refresh frequency of the one or more non-basic refresh frequencies, at the same DBV, a proportional relationship between the gamma voltages of the respective gray levels at the basic refresh frequency and the gamma voltages of the corresponding gray levels at the non-basic refresh frequency is determined. This proportional relationship may be characterized by the following equation:

$$Y=\alpha y.$$

wherein y denotes the gamma voltages of different gray levels at the basic refresh frequency, Y denotes the gamma voltages of the corresponding gray levels at the non-basic refresh frequency, and a denotes the ratios between the gamma voltages of the different gray levels at the basic refresh frequency and the gamma voltages of the corresponding gray levels at the non-basic refresh frequency, i.e., the gamma ratios.

The LTPO display module may have multiple different DBVs and may be switched among multiple different refresh frequencies, therefore a large amount of storage space may be required if the gamma ratios for each gray level at the different refresh frequencies for different DBVs have to be stored in the IC.

During actual manufacturing process, in order to reduce a time required for the gamma tuning of each device and reduce a storage space required in the IC, for each non-basic refresh frequency of the one or more non-basic refresh frequencies, the gamma ratios of only several specific gray levels in the respective gray levels at the non-basic refresh frequency at a certain DBV may be stored in the IC. Selection of the several specific gray levels from the respective gray levels may be referred to as tapping points of the gray levels, and the several specific gray levels may be referred to as the tap points gray level.

In some embodiments, the basic refresh frequency is 120 Hz and one of the one or more non-basic refresh frequencies is 30 Hz. For the non-basic refresh frequency of 30 Hz, its tap points may be determined as follows: the gamma tuning is performed at the basic refresh frequency of 120 Hz to determine the gamma voltages at 120 Hz for the respective gray level, $gamma_{120}$ 0, $gamma_{120}$ 1, . . . , $gamma_{120}$ 255: at the same DBV, the gamma tuning is performed at the non-basic refresh frequency of 30 Hz to determine the gamma voltage $gamma_{30}$ 0, $gamma_{30}$ 1, . . . , $gamma_{30}$ 255 of the corresponding gray levels at 30 Hz: and the gamma ratio 0, gamma ratio 1, . . . , gamma ratio 255 between the gamma voltages of the respective gray levels at 30 Hz and the gamma voltages of the corresponding gray levels at 120 Hz are calculated. The tap points of gray level are selected from the plurality of gray levels such that gamma ratios of the tap points of gray levels may be characterized by a segmented linear function. For example, points on a linear function determined by the gamma ratio 0 and the gamma ratio 15may cover the gamma ratio 1 to the gamma ratio 14 better. Thus, the gray level 0 corresponding to the gamma ratio 0 and the gray level 15 corresponding to the gamma ratio 15 respectively may be selected as the tap points of gray levels. In this manner, other tap points of gray levels at 30 Hz may be determined. Other tap points of gray levels at other non-basic refresh frequencies may also be determined in a similar manner.

FIG. 7B illustrates a schematic diagram of determining, for each gray level of the respective gray levels, a proportional relationship between the gamma voltage of the gray level at the basic refresh frequency and the gamma voltages of the gray level at one or more non-basic refresh frequencies at the same DBV.

Referring to FIG. 7B, for each DBV of the plurality of DBVs, the gamma tuning is performed at the basic refresh frequency to determine the gamma voltages of the plurality of gray levels at the basic refresh frequency at the DBV. For each gray level of the plurality of gray levels, it has different gamma voltages at the different non-basic refresh frequencies at the same DBV. For each gray level of the plurality of gray levels at the same DBV, a proportional relationship between the gamma voltage of the gray level at the basic refresh frequency and the gamma voltages of the gray level at the one or more non-basic refresh frequencies is determined. This proportional relationship may also be characterized by the following equation:

$$Y=\alpha y.$$

wherein y denotes the gamma voltage of the gray level at the basic refresh frequency, Y denotes the gamma voltages of the gray level at the one or more non-basic refresh frequencies, and α denotes the ratios between the gamma voltage of the gray level at the basic refresh frequency and the gamma voltages of the gray level at the one or more non-basic refresh frequencies, i.e., the gamma ratios.

The LTPO display module may have multiple different DBVs and may be switched among multiple different refresh frequencies, therefore a large amount of storage space may be required if the gamma ratios for each gray levels at the different refresh frequencies for different DBVs have to be stored in the IC.

In the actual manufacturing process, in order to reduce the time required for the gamma tuning and reduce the storage space required in the IC, for each gray level of the respective gray levels, only the gamma ratios of the gray level at several specific non-basic refresh frequencies of the one or more non-basic refresh frequencies at a certain DBV may be stored in the IC. Selection of the several specific non-basic refresh frequencies from the one or more non-basic refresh frequencies may be referred to as tapping points of non-basic refresh frequencies, and the several specific non-basic refresh frequencies may be referred to as tap points of non-basic refresh frequencies.

In some embodiments, the basic refresh frequency is 120 Hz, and the plurality of non-basic refresh frequencies may comprise 5 Hz, 10 Hz, 15 Hz, . . . , 105 Hz, 110 Hz, and 115 Hz. Taking the gray level 128 as an example, the tap points of non-basic refresh frequencies of the plurality of non-basic refresh frequencies may be determined as follows: the gamma tuning is performed at the basic refresh frequency of 120 Hz, to determine the respective gamma voltages $gamma_{120}$ 0, $gamma_{120}$ 1, . . . , $gamma_{120}$ 255 of the corresponding gray levels at 120 Hz, wherein the gamma voltage of the gray level 128 is $gamma_{120}$ 128: at the same DBV, the gamma tuning is performed at 5 Hz, 10 Hz, 15 Hz, . . . , 105 Hz, 110 Hz, and 115 Hz, respectively, to determine the gamma voltages of the respective gray levels at the multiple non-basic refresh frequencies, wherein the gamma voltages of the gray level 128 at the multiple non-basic refresh frequencies may be $gamma_5$ 128, $gamma_{10}$ 128, $gamma_{15}$ 128 . . . , $gamma_{105}$ 128, $gamma_{110}$ 128, and $gamma_{115}$ 128: gamma ratios 128, gamma $ratio_{10}$ 128, . . . , gamma $ratio_{115}$ 128 between the gamma voltages of the gray level 128 at the respective non-basic refresh frequencies and the gamma voltage of the gray level 128 at 120 Hz are calculated. The tap points of non-basic refresh frequencies are selected from the plurality of non-basic refresh frequencies, such that the gamma ratios of the tap points of non-basic refresh frequencies may be characterized by a segmented linear function. For example, the points on the linear function determined by the gamma $ratio_{10}$ 128 and the gamma $ratio_{30}$ 128 may cover the gamma ratios of the gray level 128 at each of the non-basic refresh frequencies between the gamma $ratio_{10}$ 128 and the gamma $ratio_{30}$ 128 better. Thus, the non-basic refresh frequencies 10 Hz and 30 Hz corresponding to gamma $ratio_{10}$ 128 and gamma $ratio_{30}$ 128 may be selected as the tap points of non-basic refresh frequencies.

Referring back to FIG. 5, the method for determining the polynomial relationship between the gamma voltages of the respective gray levels at the basic refresh frequency and the gamma voltages of the respective gray levels at the non-basic refresh frequencies would be described later.

In order to enable to apply different gamma voltages for the different gray levels at the different refresh frequencies without taking up a large storage space of the IC and requiring a large amount of time for gamma tuning, a polynomial relationship may be established for performing interpolation between the gamma voltages of the respective gray levels at the basic refresh frequency and the gamma voltages of the corresponding gray levels at the non-basic refresh frequencies, and the gamma voltages of the different gray levels at the non-basic refresh frequencies are determined based on the established polynomial relationship.

The gamma tuning is performed at the basic refresh frequency and at the non-basic refresh frequencies respectively, to determine the gamma voltages of the respective gray levels at the basic refresh frequency and at the non-basic refresh frequencies, and calculate the differences Δy between them. Each pixel on the LTPO display module is formed by combining a red (R) component, a green (G) component, and a blue (B) component at different brightness levels, that is, color variation of each pixel on the screen is caused by gray level variations of the three RGB sub-pixels constituting the pixel. Therefore, the differences Δy may be calculated for the R, G, and B components separately.

As shown in FIG. 5, there is an associated relationship between the differences in gamma voltages of the respective gray levels at the basic refresh frequency of 120 Hz and the non-basic refresh frequency of 30 Hz. In FIG. 5, the horizontal axis indicates the gray level, the vertical axis indicates the differences Δy between the gamma voltages of the respective gray levels at the basic refresh frequency of 120 Hz and the gamma voltages of the corresponding gray levels at the non-basic refresh frequency of 30 Hz, and the three curves indicate different DBVs. Specifically, the graph on the top of FIG. 5 illustrates the differences between the gamma voltages of the R component of the respective gray levels at the basic refresh frequency of 120 Hz and the gamma voltages of the R component of the corresponding gray levels at the non-basic refresh frequency of 30 HZ at the different DBVs (DBV1, DBV2,DBV3); the graph in the middle illustrates the differences between the gamma voltages of the G component of the respective gray levels at 120 Hz and the gamma voltages of the G component of the corresponding gray levels at 30 HZ at the different DBVs; and the graph on the bottom illustrates the differences between the gamma voltages of the B component of the respective gray levels at 120 Hz and the gamma voltages of the B component of the corresponding gray levels at 30 HZ at the different DBVs.

Referring to FIG. 5, it can be seen that the differences between the gamma voltages of the R, G, and B components of the respective gray levels at the basic refresh frequency of 120 Hz and the gamma voltages of the R, G, and B components of the corresponding gray levels at the non-basic refresh frequency of 30 Hz at the different DBVs have a clear mathematical relationship, which can be characterized by the following polynomial:

$$\Delta y = ax^2 + bx + c.$$

wherein Δy denotes the differences between the gamma voltages of different gray levels at the basic refresh frequency and the gamma voltages of the different gray levels at the non-basic refresh frequency, x denotes the gray level, and a, b, and c are the coefficients of the polynomial, respectively.

The established polynomial relationship and the corresponding polynomial coefficients may be stored in the IC in advance. In addition, the gamma voltages of the different gray levels at the basic refresh frequency of 120 Hz may also be stored in the IC in advance. By calling the polynomial relationship and data related to the gamma voltages of the respective gray levels at the basic refresh frequency, the gamma voltages of the respective gray levels at the non-basic refresh frequency may be calculated as follows $$Y = y + \Delta y.$$

wherein y denotes the gamma voltages of the different gray levels at the basic refresh frequency and Y denotes the gamma voltages of the corresponding gray levels at the non-basic refresh frequency.

However, in order to save storage space in the IC, not all polynomial coefficients a, b, c associated with all non-basic refresh frequencies are stored in the IC. In some embodiments, the polynomial coefficients of the plurality of non-basic refresh frequencies may be tapped and tap points of coefficients are stored in the IC, wherein the plurality of tap points of coefficients may be characterized by a segmented linear function.

In an example, polynomial coefficients a, b, and c for a plurality of non-basic refresh frequencies may be determined respectively, and several coefficients may be selected from them as tap points. Taking the coefficient a as an example, a plurality of coefficients a1,a2, . . . , a20 at a plurality of non-basic refresh frequencies are obtained firstly. Among the plurality of coefficients a1, a2, . . . , a6, points on a linear function determined by a1 and a5 may cover the respective coefficients a between a1 and a5 better, and thus, a1 and a5 may be selected as tap points of coefficients. Similarly, several other tap points of coefficients a may be determined in the same way.

Figure 8A:
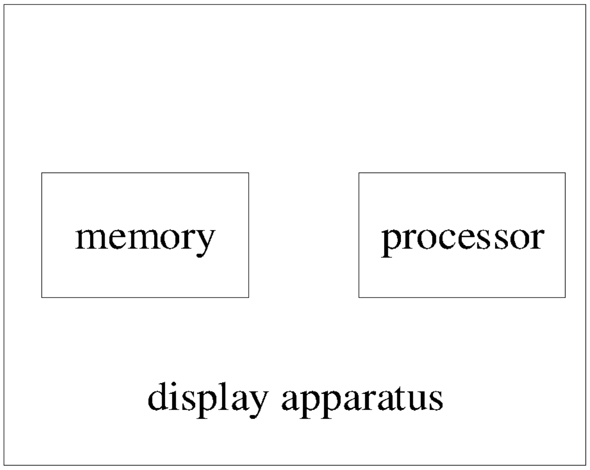
FIG. 8A is a display apparatus implementing the method for adjusting a gamma voltage of the LTPO display module in accordance with embodiments of the present disclosure.

FIG. 8A is a display apparatus implementing a method for adjusting the gamma voltages of a LTPO display module according to an embodiment of the present disclosure.

As shown in FIG. 8A, the display apparatus comprises a memory and a processor coupled to the memory, the processor is configured to: obtain a gamma voltage of the display apparatus at a basic refresh frequency: obtain an associated relationship between the gamma voltage at the basic refresh frequency and a gamma voltage at a target refresh frequency of the display apparatus: and determine the gamma voltage of the display apparatus at the target refresh frequency based on the gamma voltage of the display apparatus at the basic refresh frequency and the associated relationship.

In some embodiments, the associated relationship is a proportional relationship that may be characterized by $Y=\alpha y$, and wherein Y denotes a gamma voltage of a gray level at the target refresh frequency, y denotes a gamma voltage of the gray level at the basic refresh frequency, and $\alpha$ denotes a gamma ratio.

In some embodiments, the associated relationship is a polynomial relationship that may be characterized by $\Delta y=ax^2+bx+c$, wherein $\Delta y$ denotes the difference between the gamma voltage of a gray level at the basic refresh frequency and the gamma voltage at the gray level at the target refresh frequency, x denotes the gray level, and a, b, and c are polynomial coefficients.

Figure 8B:
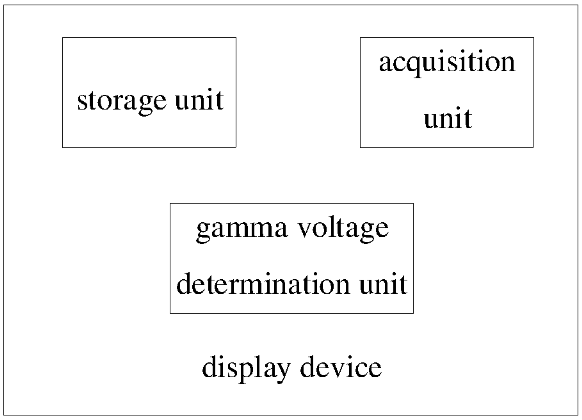
FIG. 8B is a display device implementing the method for adjusting a gamma voltage of the LTPO display module according to embodiments of the present disclosure.

FIG. 8B is a display device implementing a method for adjusting a gamma voltage of a LTPO display module according to an embodiment of the present disclosure.

As shown in FIG. 8B, the display device comprises a storage unit, an acquisition unit, and a gamma voltage determination unit.

The storage unit is configured to store a gamma voltage of the display device at a basic refresh frequency and an associated relationship between the gamma voltage of the display device at the basic refresh frequency and a gamma voltage of the display device at a target basic refresh frequency.

The acquisition unit is configured to acquire the gamma voltage of the display device at the basic refresh frequency and the associated relationship between the gamma voltage at the basic refresh frequency and the gamma voltage at the target basic refresh frequency of the display device, which are stored in the storage unit.

The gamma voltage determination unit is configured to determine the gamma voltages of the display device at the target basic refresh frequency based on the acquired gamma voltage of the display device at the basic refresh frequency and the associated relationship.

Figure 9:
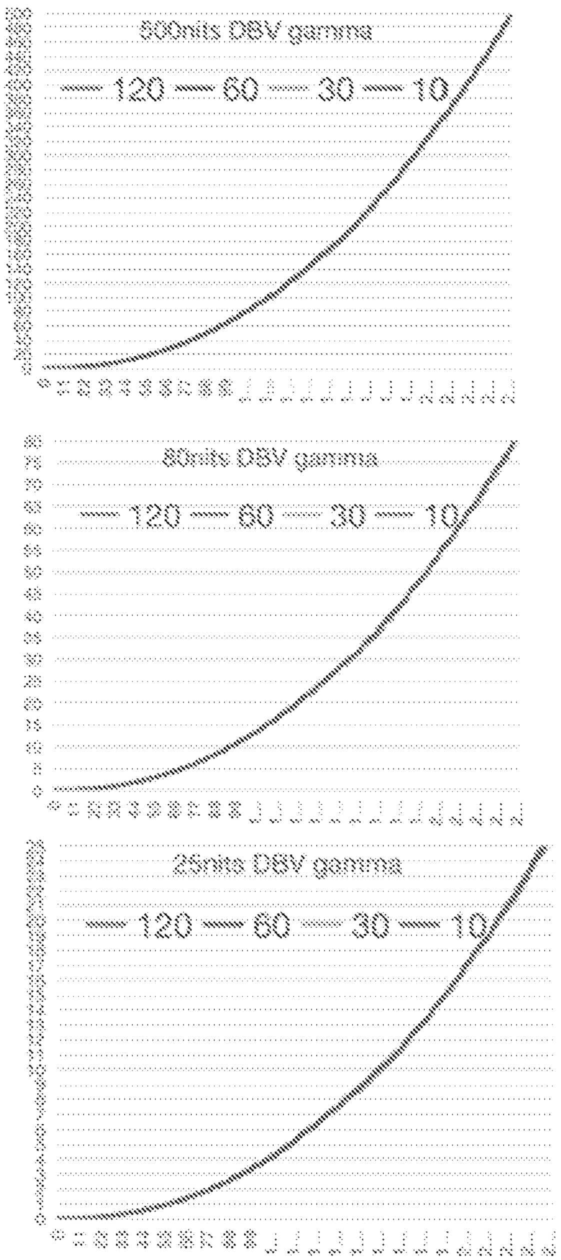
FIG. 9 is a graph illustrating measured effects of applying the method for adjusting a gamma voltage of the LTPO display module according to embodiments of the present disclosure to improve the VRR effect.

FIG. 9 is a graph illustrating measured effects of applying the method for adjusting the gamma voltage of the LTPO display module according to embodiments of the present disclosure to improve the VRR effect. The gamma curves at different DBVs at different refresh frequencies are illustrated in FIG. 9, respectively. Specifically, the graph on the top of FIG. 9 shows the gamma curves at the different refresh frequencies (120 Hz, 60 Hz, 30 Hz and 10 Hz) with a DBV of 500 nits; the graph in the middle shows the gamma curves at the different refresh frequencies (120 Hz, 60 Hz, 30 Hz and 10 Hz) with a DBV of 80 nits; and the graph on the bottom side shows the gamma curves at different refresh frequencies (120 Hz, 60 Hz, 30 Hz and 10 Hz) with a DBV of 25 nits.

Referring to FIG. 9, the gamma curves at the different refresh frequencies (120 Hz, 60 Hz, 30 Hz and 10 Hz) under the same DBV almost overlap, which indicates that the actual brightness of each gray level at the different refresh frequencies keeps unchanged for the same DBV. In FIG. 9, nits is the brightness unit nits.

By implementing the method provided by the present disclosure, it is possible to achieve assigning different gamma voltages to the different gray levels of the LTPO display module at the different refresh frequencies, so as to effectively improve the differences in brightness and chromaticity of different gray levels during switching between high and low refresh frequencies at the different DBVs.

Above are only specific implementations of the present disclosure, but the scope sought for protection in the present disclosure is not limited to this, and any changes or substitutions that can be easily thought of by any person skilled in the art within the technical scope disclosed by the present invention shall be covered by the scope sought for protection in the present disclosure. Therefore, the scope sought for protection in the present disclosure shall be stated to be subject to the scope of protection of the claims.

What is claimed is:

1. A method for adjusting a gamma voltage of a display module, comprising:

obtaining a gamma voltage of the display module at a basic refresh frequency;

obtaining an associated relationship between the gamma voltage of the display module at the basic refresh frequency and a gamma voltage of the display module at a target refresh frequency; and determining the gamma voltage of the display module at the target refresh frequency based on the gamma voltage of the display module at the basic refresh frequency and the associated relationship, wherein the associated relationship corresponds to a display brightness value of the display module, and different display brightness values correspond to respective associated relationships;

the method for adjusting the gamma voltage of the display module further comprises:

determining a current display brightness value of the display module, wherein obtaining the gamma voltage of the display module at the basic refresh frequency comprises:

obtaining, at the current display brightness value, the gamma voltage of the display module at the basic refresh frequency; and wherein obtaining the associated relationship between the gamma voltage of the display module at the basic refresh frequency and the gamma voltage of the display module at the target refresh frequency comprises:

obtaining, at the current display brightness value, the associated relationship between the gamma voltage of the display module at the basic refresh frequency and the gamma voltage of the display module at the target refresh frequency.

2. The method according to claim 1, wherein the associated relationship comprises a proportional relationship, and obtaining, at the current display brightness value, the associated relationship between the gamma voltage of the display module at the basic refresh frequency and the gamma voltage of the display module at the target refresh frequency comprises:

for each gray level of a plurality of gray levels, obtaining, at the current display brightness value, a proportional relationship between a gamma voltage of the gray level at the basic refresh frequency and a gamma voltage of the gray level at the target refresh frequency.

3. The method according to claim 2, wherein the proportional relationship is characterized by $Y=\alpha y$, and wherein Y denotes a gamma voltage of one gray level at the target refresh frequency, y denotes a gamma voltage of the one gray level at the basic refresh frequency, and $\alpha$ denotes a gamma ratio.

4. The method according to claim 2, wherein the proportional relationship is a gamma ratio, and obtaining, at the current display brightness value, the proportional relationship between the gamma voltage of the gray level at the basic refresh frequency and the gamma voltage of the gray level at the target refresh frequency comprises:

obtaining gamma ratios of at least two specific gray levels of the plurality of gray levels, wherein the gamma ratio indicates a ratio between a gamma voltage of one gray level at the basic refresh frequency and a gamma voltage of the one gray level at the target refresh frequency of the display module at the current display brightness value; and performing interpolation based on the gamma ratios of the at least two specific gray levels to obtain the gamma ratio for each gray level of the plurality of gray levels.

5. The method according to claim 2, wherein the proportional relationship is a gamma ratio, and obtaining, at the current display brightness value, the proportional relationship between the gamma voltage of the gray level at the basic refresh frequency and the gamma voltage of the gray level at the target refresh frequency comprises:

for each gray level of the plurality of gray levels, determining, among the basic refresh frequency and a plurality of non-basic refresh frequencies, at least two non-basic refresh frequencies close to the target refresh frequency;

for each non-basic refresh frequency of the at least two non-basic refresh frequencies, obtaining a gamma ratio for the non-basic refresh frequency, wherein the gamma ratio for the non-basic refresh frequency indicates a ratio between a gamma voltage of one gray level at the basic refresh frequency and a gamma voltage of the one gray level at the non-basic refresh frequency of the display module at the current display brightness value; and performing interpolation based on gamma ratios for respective non-basic refresh frequencies among the at least two non-basic refresh frequencies to obtain a gamma ratio for the target refresh frequency.

6. The method according to claim 2, wherein determining the gamma voltage of the display module at the target refresh frequency based on the gamma voltage of the display module at the basic refresh frequency and the associated relationship comprises:

for each gray level of the plurality of gray levels, determining, at the current display brightness value of the display module, the gamma voltage of the gray level at the target refresh frequency based on a product of the gamma voltage of the gray level at the basic refresh frequency and the proportional relationship between the gamma voltage of the gray level at the basic refresh frequency and the gamma voltage of the gray level at the target refresh frequency.

7. The method according to claim 1, wherein the associated relationship comprises a polynomial relationship, and obtaining, at the current display brightness value, the associated relationship between the gamma voltage of the display module at the basic refresh frequency and the gamma voltage of the display module at the target refresh frequency comprises:

obtaining a plurality of coefficients of a polynomial characterizing a voltage relationship curve between gamma voltages of respective gray levels at the basic refresh frequency and gamma voltages of the respective corresponding gray levels at the target refresh frequency of the display module at the current display brightness value.

8. The method according to claim 7, wherein the polynomial relationship is characterized by $\Delta y=\alpha a x^2+bx+c$, and wherein $\Delta y$ denotes a difference between a gamma voltage of one gray level at the basic refresh frequency and a gamma voltage of the one gray level at the target refresh frequency, x denotes the gray level, and a, b, and c are polynomial coefficients.

9. The method according to claim 7, wherein determining the gamma voltage of the display module at the target refresh frequency based on the gamma voltage of the display module at the basic refresh frequency and the associated relationship comprises:

determining, at the current display brightness value of the display module, the gamma voltages of the respective gray levels at the target refresh frequency based on the gamma voltages of the respective gray levels at the basic refresh frequency and the plurality of coefficients.

10. A method for determining an associated relationship between gamma voltages of a display module, comprising:

measuring a gamma voltage of the display module at a basic refresh frequency;

measuring a gamma voltage of the display module at one or more non-basic refresh frequencies; and determining an associated relationship between the gamma voltages of the display module based on the gamma voltage of the display module at the basic refresh frequency and the gamma voltage of the display module at the one or more non-basic refresh frequencies, wherein the associated relationship corresponds to a display brightness value of the display module, and different display brightness values correspond to respective associated relationships;

the method further comprising: measuring a current display brightness value of the display module, wherein measuring the gamma voltage of the display module at the basic refresh frequency comprises:

measuring, at the current display brightness value, gamma voltages of a plurality of gray levels of the display module at the basic refresh frequency; and wherein measuring the gamma voltage of the display module at the one or more non-basic refresh frequencies comprises:

for each non-basic refresh frequency of the one or more non-basic refresh frequencies, measuring, at the current display brightness value, gamma voltages of the plurality of gray levels of the display module at the non-basic refresh frequency.

11. The method according to claim 10, wherein the associated relationship comprises a proportional relationship, and determining the associated relationship between the gamma voltages of the display module based on the gamma voltage of the display module at the basic refresh frequency and the gamma voltage of the display module at the one or more non-basic refresh frequencies comprises:

for each non-basic refresh frequency of the one or more non-basic refresh frequencies, determining, at the current display brightness value, gamma ratios indicating ratios between the gamma voltages of the plurality of gray levels at the basic refresh frequency and the gamma voltages of respective corresponding gray levels at the non-basic refresh frequency.

12. The method according to claim 10, wherein the associated relationship comprises a proportional relationship, and determining the associated relationship between the gamma voltages of the display module based on the gamma voltage of the display module at the basic refresh frequency and the gamma voltage of the display module at the one or more non-basic refresh frequencies comprises:

for each gray level of the plurality of gray levels, determining, at the current display brightness value, a gamma ratio indicating a ratio between the gamma voltage of the gray level at the basic refresh frequency and the gamma voltage of the gray level at the one or more non-basic refresh frequencies.

13. The method according to claim 10, wherein the associated relationship comprises a polynomial relationship, and determining the associated relationship between the gamma voltages of the display module based on the gamma voltage of the display module at the basic refresh frequency and the gamma voltage of the display module at the one or more non-basic refresh frequencies comprises:

determining, at the current display brightness value, a plurality of coefficients of a polynomial for characterizing a voltage relationship curve between the gamma voltages of the plurality of gray levels at the basic refresh frequency and the gamma voltages of the plurality of corresponding gray levels at the one or more non-basic refresh frequencies of the display module.

14. A display apparatus, comprising:

a memory; and a processor, coupled to the memory and configured to:

obtain a gamma voltage of the display apparatus at a basic refresh frequency;

obtain an associated relationship between the gamma voltage of the display apparatus at the basic refresh frequency and a gamma voltage of the display apparatus at a target refresh frequency; and determine the gamma voltage of the display apparatus at the target refresh frequency based on the gamma voltage of the display apparatus at the basic refresh frequency and the associated relationship, wherein the associated relationship corresponds to a display brightness value of the display module, and different display brightness values correspond to respective associated relationships;

the method for adjusting the gamma voltage of the display module further comprises:

determining a current display brightness value of the display module, wherein obtaining the gamma voltage of the display module at the basic refresh frequency comprises:

obtaining, at the current display brightness value, the gamma voltage of the display module at the basic refresh frequency; and wherein obtaining the associated relationship between the gamma voltage of the display module at the basic refresh frequency and the gamma voltage of the display module at the target refresh frequency comprises:

obtaining, at the current display brightness value, the associated relationship between the gamma voltage of the display module at the basic refresh frequency and the gamma voltage of the display module at the target refresh frequency.

* * * * *